United States Patent Office 2,959,160
Patented Nov. 8, 1960

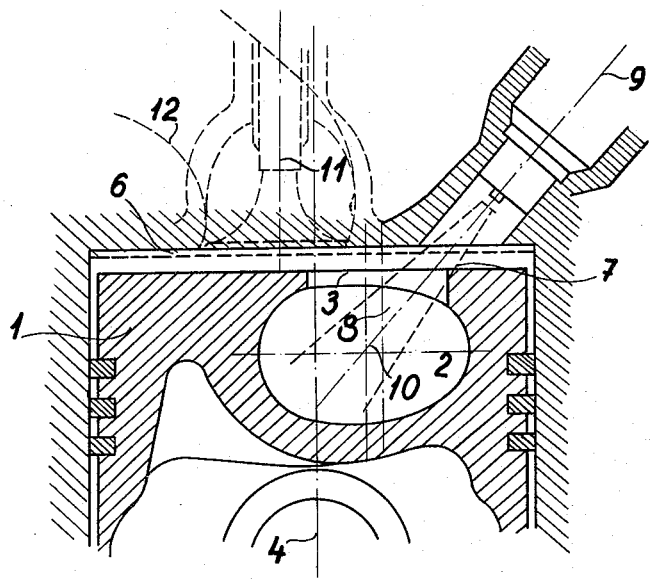
FIG. 1
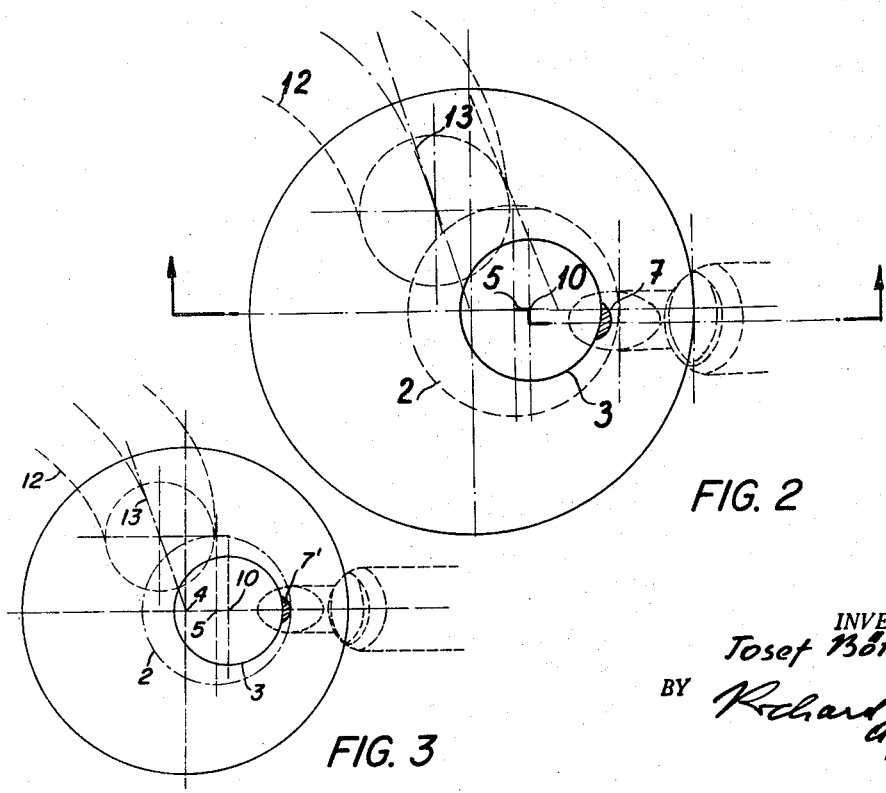
FIG. 2
FIG. 3
INVENTOR.
Josef Böttger

2,959,160

INTERNAL-COMBUSTION ENGINE WITH LOCALISED COMPRESSION IGNITION

Josef Böttger, Prague, Czechoslovakia, assignor to Ustav pro vyzkum motorovych vozidel, Prague, Czechoslovakia Filed Aug. 14, 1958, Ser. No. 754,977

Claims priority, application Czechoslovakia Aug. 20, 1957

4 Claims. (Cl. 123—32)

This invention relates to an internal-combustion engine having localized compression ignition and a combustion chamber in the shape of a sphere, pear or any other body of revolution, and into which fuel is injected from a single-hole, pintle-type, or other injection nozzle.

The known feature of localizing the ignition at a single point is applied, according to the present invention, to engines which employ single-hole or pintle-type injection nozzles for the fuel injection.

Heretofore, ignition of fuel on a localised surface has usually been obtained by the use of at least two fuel jets. One of the jets is shorter and serves for ignition, while the other longer jet carries the remaining fuel to regions of the combustion chamber which are more remote and cooler than that against which the shorter ignition jet impinges. The fuel injection and the subsequent burning are performed in conjunction with an intensive air rotation (turbulence) within the combustion chamber.

In contrast to the known constructions, in which at least two jets are injected so that one of them acts as an ignition jet, the present invention achieves a similar effect by the use of a single jet discharged from a single-hole or pintle-type fuel nozzle. The entire compression space, the combustion chamber, the nozzle and the discharge jets are so arranged that a small portion of the jet impinges against the hottest point of the combustion chamber, while the major portion of the jet is injected into the actual combustion space having, at its bottom, a lower temperature and which contains substantially all the combustion air at the end of the compression stroke. More accurately, it is a small portion of the envelope or outside part of the fuel jet, that strikes upon the top of the piston adjacent the hot edge of an opening leading from the piston top to the actual combustion space.

At the selected hottest point, against which only a portion of the fuel jet impinges towards the end of the injection period, a localized self-ignition takes place, and the flame gradually spreads from that point to the remaining portions of the fuel jet discharged towards cooler regions of the wall of the combustion chamber. The gradual flame propagation to the more remote combustion chamber regions is assisted by the radial air stream flowing from the compression space above the piston into the combustion chamber within the piston during the compression stroke.

As a result of the stated arrangement of a combustion chamber in a compression-ignition engine, knocking is substantially reduced and perfect burning of the fuel and utilization of the combustion air are obtained, as is proved by the smokeless combustion that results. Due to the elimination of knocking, which adversely affects the engine performance, a smooth and shock-free operation is obtained, which prolongs the useful life of the component parts of the engine, such as, the pistons, connecting rods, bearings and crank shaft.

The present invention will be explained in more detail in the following description with reference to the accompanying drawings, wherein Fig. 1 shows diagrammatically a longitudinal section of an engine having an offset combustion chamber, Fig. 2 shows a corresponding plan view, and Fig. 3 is a plan view of a modification of the engine of Fig. 2.

As shown, the top of a piston 1 has a combustion chamber 2 formed therein which has the shape of an ellipsoid of revolution and is in communication with the space above the piston through a transfer opening 3. The axis of revolution or symmetry 5 of the combustion chamber 2 is offset with respect to the central axis 4 of the engine cylinder, and the central axis 10 of the transfer opening 3 is offset in the same direction with respect to the axis 5 of the chamber 2. As a result of this relative displacement of the above mentioned axes, the air flows into the combustion chamber in a substantially axial and radial direction and at almost a constant velocity over the whole circumference of the transfer opening 3, without any tangential components of air rotation around the axis 5 of the combustion chamber 2, during the compression stroke.

The piston 1 is shown in Fig. 1 in a position corresponding to the end of the injection period and just before reaching the top dead center position, indicated by a broken line 6. Fig. 2 shows the top of the piston 1, and clearly indicates the offsetting of the axis 5 of the combustion chamber 2 with respect to the axis 4 of the cylinder, and of the axis 10 of the transfer opening 3 with respect to the axis 5 of the combustion chamber 2.

The fuel nozzle 9 is laterally arranged in an inclined position so that its axis and the cylinder axis 4 enclose a certain suitable angle. A single-hole or a pintle-type fuel injection nozzle is used, and is so arranged that only a small portion of the envelope of fuel jet 8 passes, at a given position of the piston 1, over the point 7 of the edge of the transfer opening 3, so that only such small portion of the injected fuel impinges on the hottest point of the top of the piston, and the remaining portion of the fuel jet is directed towards the cooler regions within the combustion chamber. Thus, at point 7, a localized ignition spot is formed from which the flame gradually advances into the combustion chamber. The fact that, at the point 7, a high temperature exists which is suitable for localized self-ignition of a small fuel portion, is due to the fact that the air flows at a constant velocity over the edge of the transfer opening 3 into the space 2, so that the temperature along this edge is constant, and at the same time is higher than the temperature in the combustion chamber proper which, in addition may be oil-cooled from the underside. As a result, it is now possible to select the position of the point 7 anywhere along the circumference of the transfer opening 3 to fulfill theoretically established conditions.

In the embodiment of the invention illustrated in Fig. 2, the fuel nozzle 9 is offset with respect to the plane which includes the cylinder axis 4, the combustion chamber axis 5 and the axis 10 of the transfer opening 3. Thus, the point 7 is also offset with respect to this plane, however, the effect is the same, as if the nozzle axis were in the plane of the axes 4, 5 and 10, as shown in Fig. 3 which also shows the ignition point 7' displaced so as to be in line with the aligned axes.

Figs. 1 and 2, also indicate the radial path of airflow into the cylinder by showing, in broken lines, the intake valve 11 and the intake channel 12. The opening of this channel 12 into the cylinder is preferably arranged in the direction of the connecting line 13 between the axis of the intake valve 11 and the axis 4 of the cylinder.

The invention is not limited to the described and illustrated embodiment, which is presented only by way of an example, and includes all alternative embodiments, where a localized ignition spot is formed by using a single-hole or pintle-type injection nozzle which sprays only a portion of its single fuel jet against the hottest spot of the piston adjacent to the combustion chamber proper, while the remaining portion of the fuel is directed into the combustion chamber having its wall at a lower temperature.

What I claim is:

1. In an internal combustion engine employing direct fuel injection and self-ignition; the combination of at least one cylinder with a piston reciprocable therein, said piston having a combustion chamber in the top portion thereof, said combustion chamber communicating with the space in said cylinder above said piston through an opening which opens in the top surface of the piston, and a fuel injection nozzle projecting a single jet of fuel towards said combustion chamber, said nozzle being arranged relative to said combustion chamber so that a small portion of the envelope of said single fuel jet strikes upon the top of the piston adjacent the hot edge of said opening to effect ignition, while the remaining major portion of said single fuel jet is directed into said combustion chamber.

2. In an internal combustion engine employing direct fuel injection and self-ignition; the combination of at least one cylinder with a piston reciprocable therein, said piston having a combustion chamber in the top portion thereof in the shape of a body of revolution with a sufficient volume to accommodate substantially all of the combustion air at the end of the compression stroke, said combustion chamber communicating with the space in said cylinder above the piston by way of a restricted opening which opens in the top surface of said piston, and a fuel injection nozzle emitting a single fuel jet during an injection period coinciding with the concluding portion of said compression stroke, said fuel jet being directed with its longitudinal axis at an angle to the plane of said top surface and intersecting the bottom of said combustion chamber at a point which is offset relative to the intersection of the central axis of said body of revolution and said bottom of the combustion chamber, so that only a small portion of the envelope of said single fuel jet will strike upon the top of the piston adjacent the hot edge of said opening, while the remainder of said single fuel jet is directed through said opening into said combustion chamber and reaches the bottom of the latter only shortly before the conclusion of said injection period.

3. In an internal combustion engine employing direct fuel injection and self-ignition; the combination as in claim 2, wherein said small portion of the envelope of said single jet strikes upon the piston top adjacent said hot edge only when said jet has attained its maximum free length where its end remote from the nozzle impinges against the bottom of said combustion chamber.

4. In an internal combustion engine employing direct fuel injection and self-ignition; the combination as in claim 2, wherein said axis of the single fuel jet is parallel to, and spaced from, a plane passing through the central axis of said cylinder and the central axis of said body of revolution.

References Cited in the file of this patent

FOREIGN PATENTS

| | | |
|---|---|---|
| 531,910 | Great Britain | Jan. 14, 1941 |
| 643,351 | Great Britain | Sept. 20, 1950 |
| 777,531 | Great Britain | June 26, 1957 |
| 473,697 | Italy | Aug. 7, 1952 |

OTHER REFERENCES

German application Serial No. M–24,978, printed Apr. 19, 1956 (Kl 46a2).